United States Patent [19]

Kessler et al.

[11] Patent Number: 4,917,213

[45] Date of Patent: Apr. 17, 1990

[54] POWER TRANSMISSION

[75] Inventors: James A. Kessler, Troy; Gerald A. Gyomory, Taylor, both of Mich.

[73] Assignee: Vickers, Incorporated, Troy, Mich.

[21] Appl. No.: 364,871

[22] Filed: Jun. 12, 1989

[51] Int. Cl.[4] ........................ B66F 11/04; F16D 31/00

[52] U.S. Cl. ........................................... 182/2; 91/362

[58] Field of Search .................. 182/2; 91/362, 363 R

[56] References Cited

U.S. PATENT DOCUMENTS

| | | | |
|---|---|---|---|
| 3,844,378 | 10/1974 | Balogh | 182/2 |
| 4,044,856 | 8/1977 | Stevenson | 182/2 |
| 4,744,218 | 5/1988 | Edwards | 414/699 |
| 4,757,747 | 7/1988 | Blatter | 91/362 |

*Primary Examiner*—Reinaldo P. Machado
*Attorney, Agent, or Firm*—Barnes, Kisselle, Raisch, Choate, Whittemore & Hulbert

[57] ABSTRACT

An electrohydraulic control system that includes a plurality of electrohydraulic devices coupled to a remote master controller by a high-speed serial communication bus. The bus has a serial differential transmission line, and a control line for indicating impending transmission of data from one controller and conditioning the other controllers to receive information. Sections of the communication bus are electrically isolated from each other, while maintaining data and control line signal integrity therebetween, by electro-optical interface modules that include transmitters and receivers interconnected by lengths of fiber optic line, and interface drivers having signal ports respectively interconnecting the fiber optic transmitters and receivers to associated sections of the communication bus. An oscillator in the interface module at the isolated end of the bus cooperates with a filter in the module at the bus end of the optic fibers to condition the interface driver at the bus end to receive or transmit data from or to the bus as a function of the transmit/receive control output from the isolated controller. Interconnection is thus accomplished employing only a pair of fiber optic transmitters and receivers, and a pair of fiber optic lines, greatly reducing the cost that would otherwise be incurred if the transmit/receive control line were handled by separate fiber optics.

16 Claims, 5 Drawing Sheets

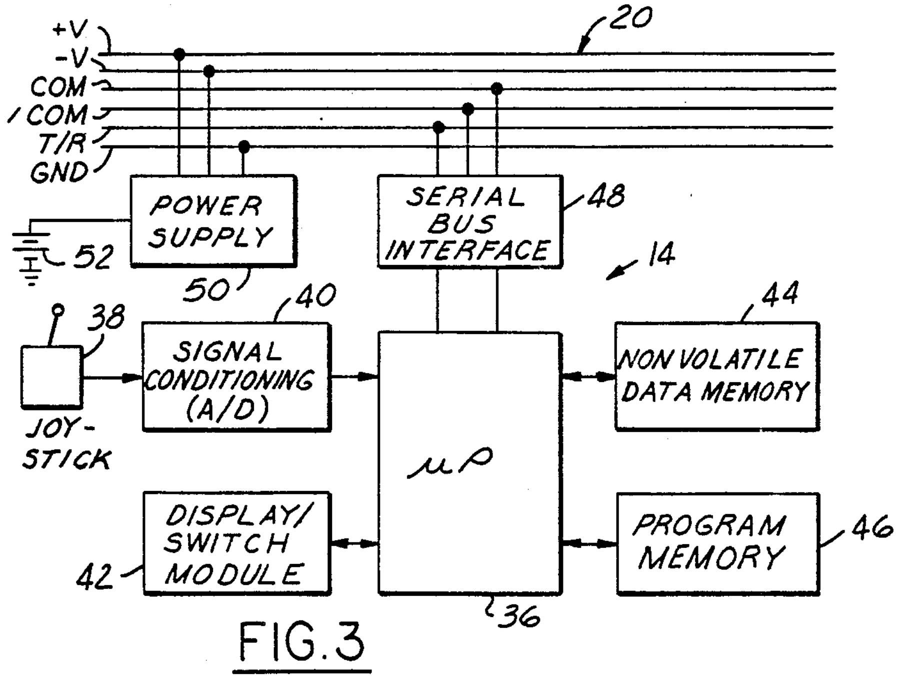
FIG. 3
FIG. 4
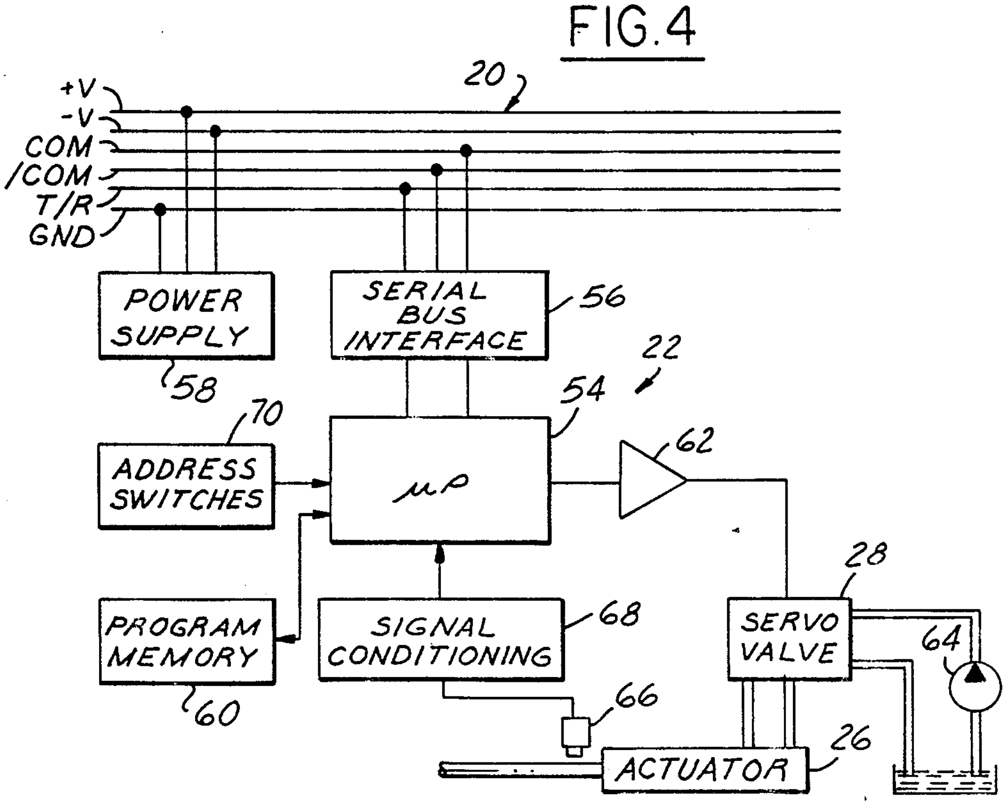

POWER TRANSMISSION

The present invention is directed to communication systems, and more particularly to communication among a master controller and individual device controllers of a distributed electrohydraulic servo control system.

BACKGROUND AND OBJECTS OF THE INVENTION

In electrohydraulic systems that include a plurality of electrohydraulic devices, such as valve-controlled actuators, pumps and motors, it is conventional practice to couple such devices to a remote master controller for coordinating device operation to perform desired tasks. Motors and actuators may be employed, for example, at several coordinated stages of a machine tool line for automated transfer and machining of parts at a series of work stations. In another typical application, the moving components of a man-lift platform may be coupled to electrohydraulic actuators controlled by a master controller on the platform responsive to operator lever or joystick inputs. In accordance with conventional practice, the master controller is coupled through individual digital-to-analog converters to the various remotely-positioned electrohydraulic devices for supplying control signals thereto. For closed-loop operation, a sensor is positioned at each electrohydraulic device for sensing operation thereof, and feeds a corresponding sensor signal to the remote master controller through an analog-to-digital converter or appropriate signal conditioner.

U.S. Pat. No. 4,744,218 (V-3939) and U.S. Application Ser. No. 164,958, filed Mar. 7, 1988 and assigned to the assignee hereof (V-4095), disclose electrohydraulic control systems in which a plurality of electrohydraulic devices are connected in common to a remote master controller by a high-speed serial communication bus. This electrohydraulic bus technique addresses and overcomes problems theretofore extant in the art as outlined in the preceding paragraph. However, it has been found that some applications of the bus technique require electrical isolation of one or more controllers from earth ground. For example, in man-lift platform applications of the type previously described, it is desirable to isolate the master controller on the platform from electrical ground for use in conjunction with high-voltage power lines and the like. It is therefore an object of the present invention to provide an improved communication system, having particular utility in bussed electrohydraulic control systems of the described character, that includes facility for electrically isolating one or more controllers from each other and from electrical ground.

SUMMARY OF THE INVENTION

An electrohydraulic control system in accordance with a presently preferred embodiment of the invention includes a plurality of electrohydraulic devices coupled to a remote master controller by a high-speed serial communication bus. The bus includes a serial data line differential pair, and a control line for indicating impending transmission of data from one controller and conditioning the other controllers to receive information. Sections of the communication bus are electrically isolated from each other, while maintaining data and control line signal integrity therebetween, by electro-optical interface modules that include transmitters and receivers interconnected by lengths of fiber optic line, and interface drivers having signal ports respectively interconnecting the fiber optic transmitters and receivers to associated sections of the communication bus. An oscillator in the interface module at the isolated end of the optical fibers cooperates with a filter in the module at the bus end to condition the interface driver at the bus end to receive or transmit data from or to the bus as a function of the transmit/receive control output from the isolated controller. Interconnection is thus accomplished employing only a pair of fiber optic transmitters and receivers, and a pair of fiber optic lines, greatly reducing the cost that would otherwise be incurred if the transmit/receive control line were handled by separate fiber optics.

BRIEF DESCRIPTION OF THE DRAWINGS

The invention, together with additional objects, features and advantages thereof, will be best understood from the following description, the appended claims and the accompanying drawings in which:

FIG. 3 is a more detailed functional block diagram of the master controller illustrated in FIGS. 1 and 2;

FIG. 4 is a more detailed functional block diagram of the boom extension controller illustrated in FIG. 2.

DETAILED DESCRIPTION OF PREFERRED EMBODIMENT

Figure 1:
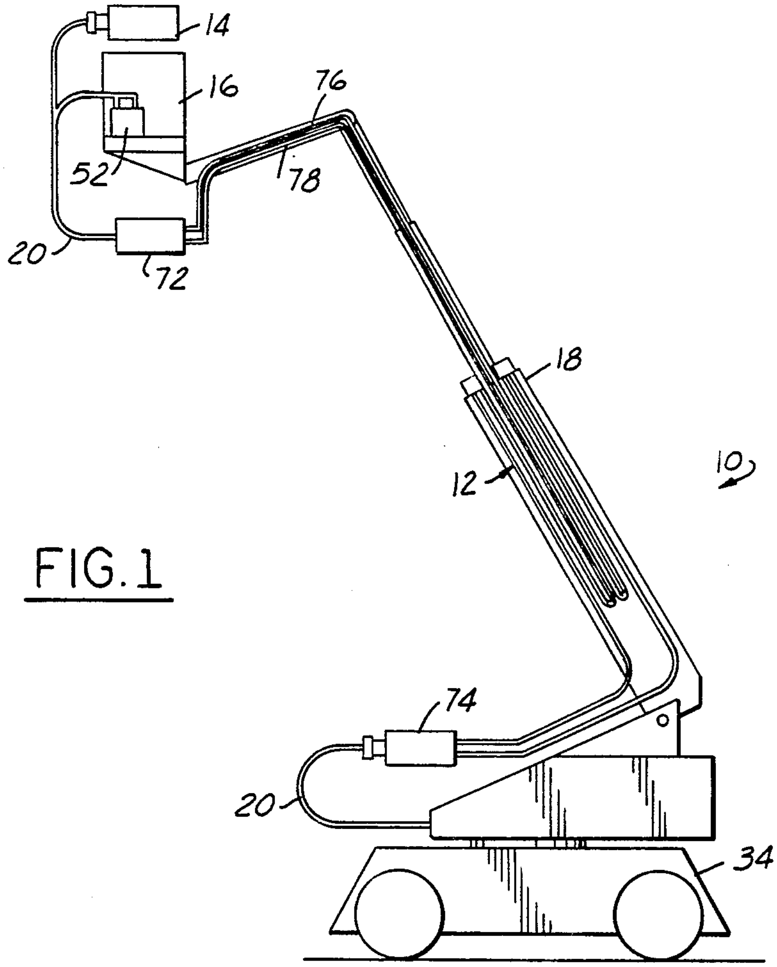
FIG. 1 is a schematic perspective view of a man-lift platform vehicle equipped with an electrohydraulic control and communication system in accordance with a presently preferred embodiment of the invention.
Figure 2:
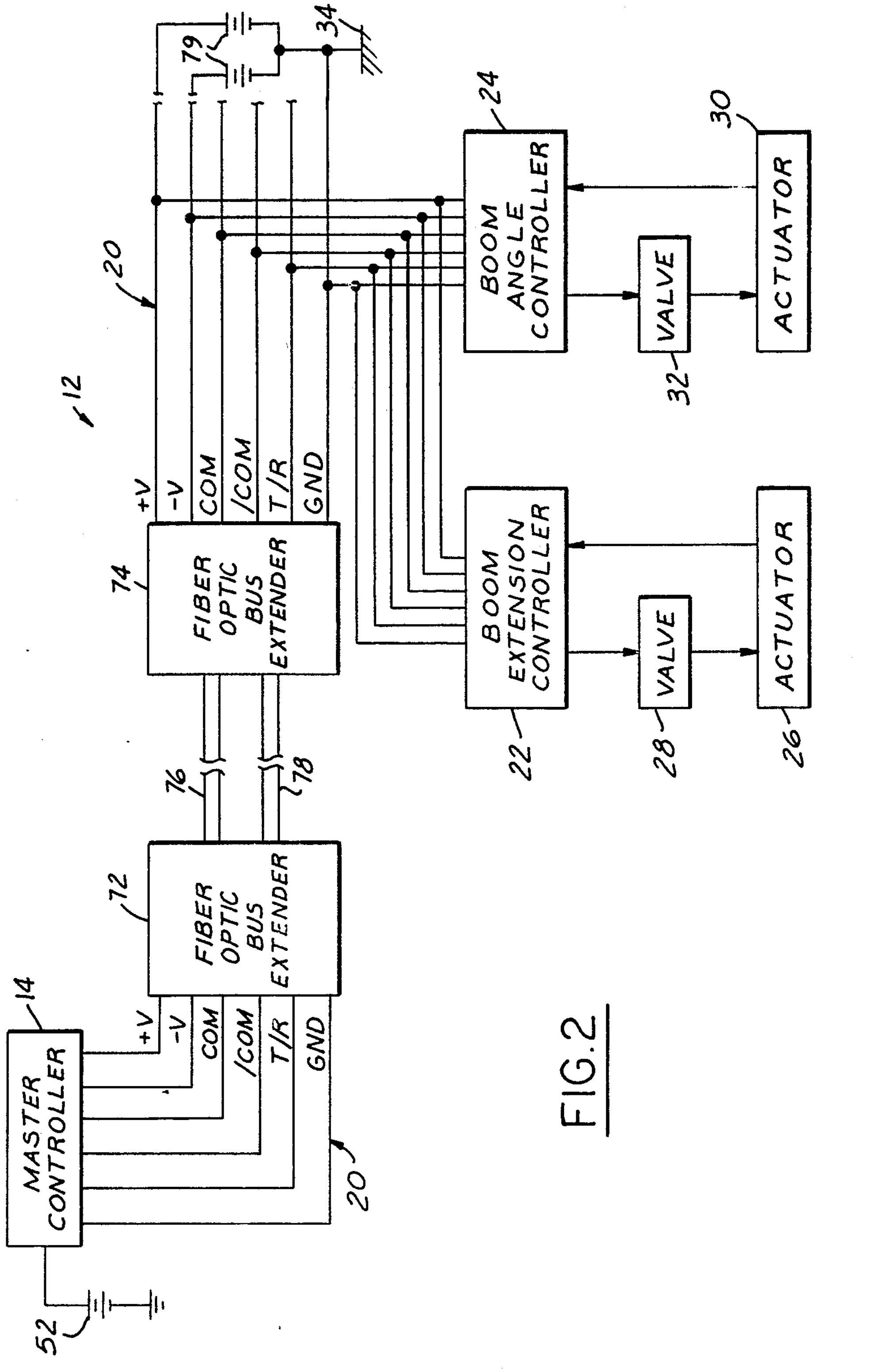
FIG. 2 is a functional block diagram of the electrohydraulic control and communication system embodied in the vehicle of FIG. 1.

FIGS. 1 and 2 illustrate a man-lift platform vehicle 10 equipped with an electrohydraulic control and communication system 12 in accordance with a presently preferred embodiment of the invention. Control system 12 includes a master controller 14 carried on a platform 16 at the end of an extensible boom 18. Controller 14 is connected by an electrohydraulic bus 20 (FIG. 2) to a boom extension controller 22 and a boom angle controller 24. An actuator 26 and an associated electrohydraulic valve 28 are coupled to controller 22 for controlling the length or extension of boom 18. Likewise, an actuator 30 and an associated valve 32 are coupled to controller 24 for controlling angle of boom 18 with respective to vehicle base 34 (FIG. 1). (Master controller 14 may be duplicated on the vehicle base.)

Referring to FIG. 3, master controller 14 includes a microprocessor 36 that receives operator inputs from a joystick 38 or the like through an a/d converter or other suitable conditioning circuitry 40. Microprocessor 36 also communicates with a display/switch module 42 that includes switches for selective operator input or modification of system parameters, and a display for indicating system status and operation to the operator. Microprocessor 36 is also interconnected with a non-volatile data memory 44 for storing parameters required by the controlled devices, and to a memory 46 for storing system operating programs. Microprocessor 50 has input and output ports connected through a serial interface 48 to a differential pair data transmission line COM, /COM, and to a T/R control line for conditioning the various controllers in the data transmission or reception mode. A power supply 50 is connected to a battery 52, also carried by platform 16, to supply electrical power to the electronics of controller 14, and to the power lines +V, −V and GND of bus 20.

Boom extension controller 22 is illustrated in FIG. 4 as including a microprocessor 54 having input and output ports coupled through a serial interface 56 to the COM, /COM and T/R lines of bus 20. A power supply 58 receives electrical power from the +V, −V and GND lines of bus 20. Microprocessor 54 is coupled to a memory module 60 having stored therein one or more programs for controlling operation of actuator 26. Microprocessor 54 is also connected through a power amplifier 62 to provide pulse width modulated signals to servo valve 28 for controlling flow of hydraulic fluid from a pump 64 to actuator 26. A position transducer 66 is responsive to motion at actuator 26 for providing a position signal to microprocessor 54 through signal conditioning circuitry 68. Address selection switches 70 or the like are connected to microprocessor 54 for preselection of a communication address to be associated with boom extension controller 22. Boom angle controller 24 is structurally identical to boom extension controller 22.

To the extent thus far described, electrohydraulic control system 12 is essentially similar to that disclosed in U.S. Pat. No. 4,744,218, the disclosure of which is incorporated herein by reference for purposes of background. U.S. Pat. No. 4,757,747 (V-3951) discloses a servo valve assembly that includes a servo valve and associated microprocessor-based controller in a single unit, and is suitable for use in conjunction with boom extension controller 22/valve 28 and boom angle controller 24/valve 32 (FIG. 2).

In accordance with the present invention, master controller 16 and battery 52 carried by platform 16 are electrically isolated from controllers 22, 24 on vehicle base 34 by a pair of fiber optic bus extender modules 72, 74 (FIGS. 1 and 2) interconnected by a pair of optical fibers 76, 78. Extender module 72 is carried by platform 16 and interfaces bus 20 to fibers 76, 78. Fibers 76, 78 extend through boom 18, and are extensible therewith. Extender module 74 is carried by vehicle base 34 and interfaces the signals on fibers 76, 78 with bus 20 connected to controllers 22, 24. Thus, the electronics on platform 16 are electrically isolated from the electronics on vehicle base 34, including base electrical ground. The boom extension and angle controllers are powered by separate batteries 79.

Figure 5A:
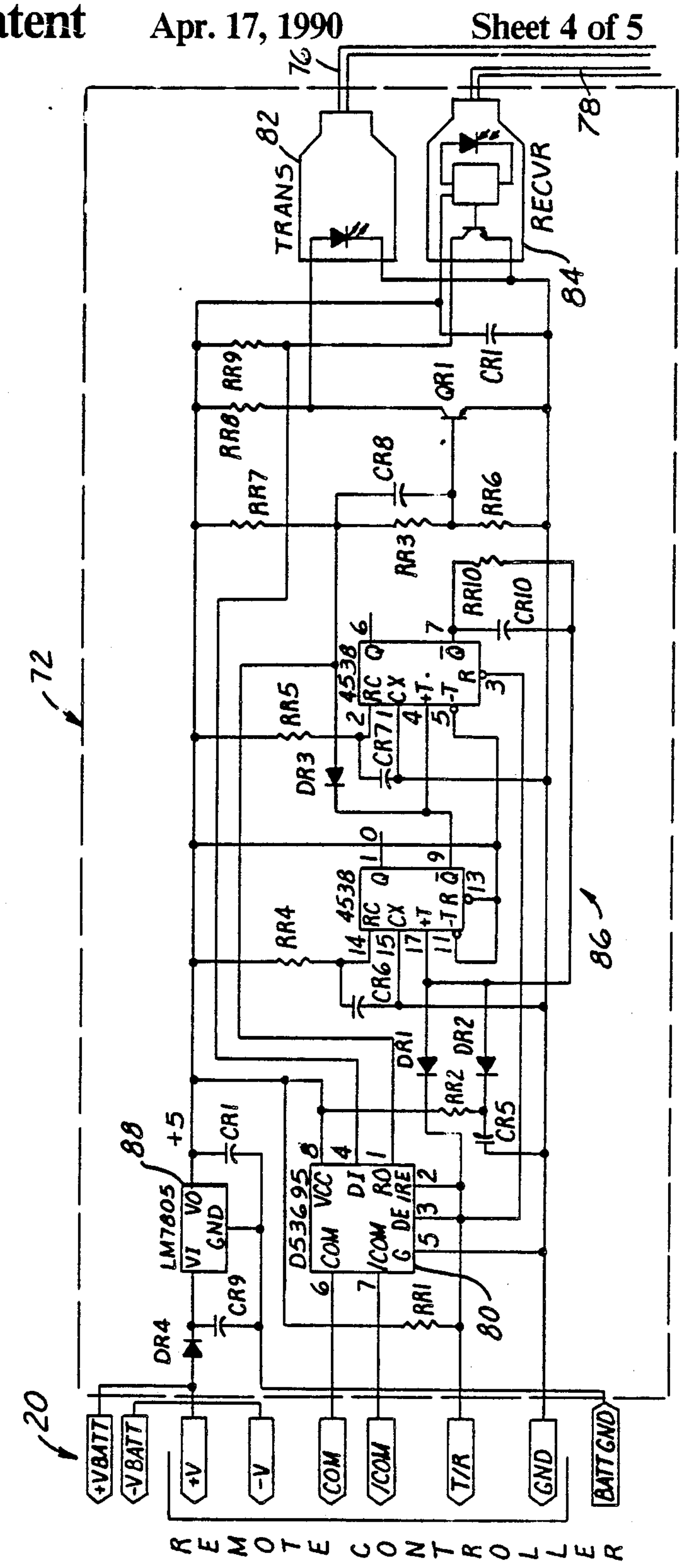
FIGS. 5A and 5B are electrical schematic diagrams of the fiber optic bus extender modules at the master and boom controller ends of the bus in the block diagram of FIG. 2.
Figure 5B:
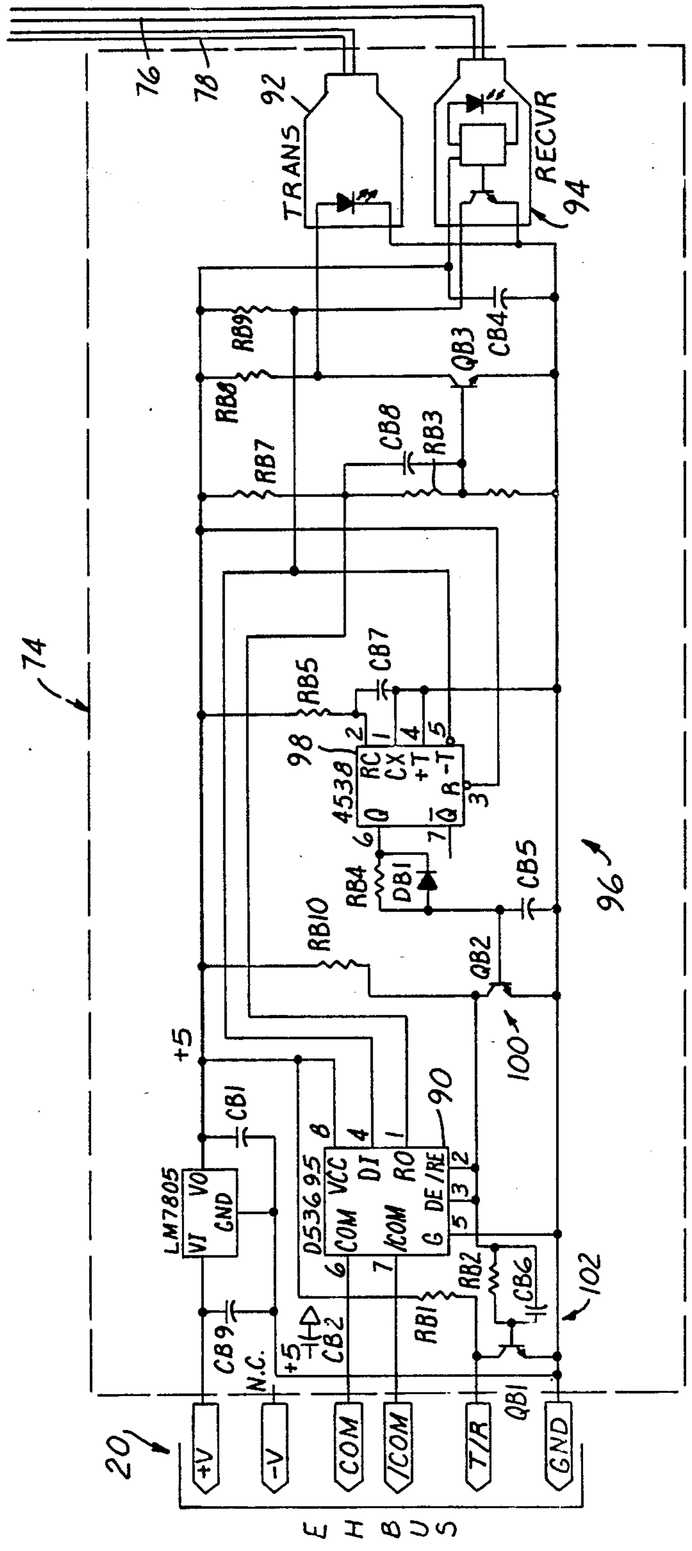

Extender modules 72, 74 are illustrated in greater detailed in FIGS. 5A and 5B respectively. Referring to FIG. 5A, a differential transmission bus interface driver 80, preferably an RS485 driver, has differential data ports connected to the COM and /COM differential data lines of bus 20. The other signal ports (DI and RO) of driver 80 are respectively connected to a fiber optic transmitter 82 coupled to fiber 76, and a fiber optic receiver 84 coupled to fiber 78. The T/R control line of a bus 20 is connected within module 82 to the transmit/receive control ports (DE and /RE) of driver 80, and to the control input of a high frequency oscillator 86. The output of oscillator 86 is connected through an isolation diode DR3 to optic transmitter 82 in parallel with the corresponding output port RO of driver 80 at the base of the drive transistor QR1. Extender module 72 is powered by battery 52 (FIGS. 1–3) through a voltage regulator 88. The control input of oscillator 86 is also connected to a capacitor CR5, which is connected through a resistor RR2 to the power supply for initiating operation of oscillator 86 upon application of battery power.

Referring to FIG. 5B, bus extender module 74 also includes a differential transmission line driver 90 that has differential signal ports connected to the COM and /COM lines of bus 20, a transmission port RO connected through a transistor QB3 to a fiber optic transmitter 92, and a signal reception port DI connected to a fiber optic receiver 94. Transmitter 92 and receiver 94 are respectfully coupled to fibers 78, 76. A filter 96 is connected to the output of receiver 94 in parallel with the reception port of driver 90. Filter 96 includes a retriggerable one-shot 98 that has its output connected through a resistor RB4 and a capacitor CB5 to the base of a transistor QB2, which thus forms an integrator for the pulsed output of one-shot 98. A diode DB1 is connected in reverse polarity across resistor RB4 for rapidly discharging capacitor CB5 when one-shot 98 times out. The output of integrator 100 is connected to the transmit/receiver control ports (DE and /RE) of driver 90, and through an inverter 102 to the T/R line of bus 20.

In operation, the T/R control line of bus 20 is normally high, and is brought low by any controller 14, 22, 24, seeking to transmit data, thereby alerting and conditioning the remaining controllers to receive information. This T/R function is maintained over the fiber optic bus extension in accordance with the present invention. Specifically, at the isolated or extended end of bus 20 where controller 14 is positioned, the T/R control line of extender module 72 (FIG. 5A) is normally high, enabling operation of oscillator 86 and transmission of a high frequency pulsed periodic signal to module 74 through coupler 82 and fiber 76. In the meantime, driver 80 is conditioned to receive any data transmitted from extension and angle controllers 22, 24 (FIG. 2), and to retransmit such data to master controller 14 along the isolated bus section. The output of oscillator 86 continually retriggers one-shot 98 (FIG. 5B) of extender module 74, so that the output of integrator 100 is low and the output of inverter 102 is high, thereby replicating the high state of the T/R line at the isolated bus section in the corresponding line of the main bus section. In the meantime, the low output of integrator 100 conditions driver 90 to receive data on the COM and /COM lines, and to transmit such data through driver 92 and fiber 78 to receiver 84 of module 72 (FIG. 5A). Most preferably, oscillator 86 has an output frequency in excess of the maximum design data transmission frequency of bus 20, preferably about two megahertz. The corresponding cutoff frequency of filter 96 is one megahertz.

The bus extender is thus normally configured to transmit data in one direction, specifically from device controllers 22, 24 to master controller 14. If either controller 22, 24 brings its T/R line low, extender modules 72, 74 are unaffected.

In the event that master controller 14 seeks to transmit data and pulls its T/R control line low, driver 80 (FIG. 5A) of extender module 72 is correspondingly conditioned to transmit signals at the COM and /COM ports to transmitter 82. In the meantime, a low input to oscillator 86 inhibits oscillator operation, thereby terminating the high frequency periodic signal to the input of retriggerable one-shot 98 (FIG. 5B). When one shot 98 times out, and the Q output thereof to integrator 100 goes low, the integrator is rapidly discharged though diode DB1 so that the output of transistor QB2 assumes a high state. Driver 90 is thereby conditioned to receive data from receiver 94 and place such data signals on the COM and /COM lines of bus 20. In the meantime, the T/R control line of bus 20 is brought low by inverter 102, thereby conditioning boom extension controller 22 (FIG. 2) and boom angle controller 24 to receiver data from master controller 14. Data transmission is well below the retrigger period of one-shot 98. Diode DB1 ensures that capacitor CB5 discharges between data signals, so that the collector of transistor QB2 remains high.

When such transmission is completed and master controller 14 restores its T/R control line to its normally high state, operation of oscillator 86 is enabled, one-shot 98 (FIG. 5B) is triggered, and driver 90 is reconditioned to transmit data from boom extension and angle controllers 24 to master controller 14.

It will be noted that the circuits of modules 72, 74 are similar in many respects. Preferably, circuitboards are designed to accommodate either circuit, which reduces necessary part inventory.

We claim:

1. An electrohydraulic system with distributedcontrol comprising:

a plurality of electrohydraulic devices responsive to electronic control signals for performing hydraulic operations and control means for providing said control signals, said control means including at least one individual device control means associated with and dedicated to directly controlling operation at an associated electrohydraulic device, central control means, a high speed serial bus coupling said central control means to said device control means, said bus including a serial data line and a control line for indicating impending transmission from one of said control means and conditioning other of said control means to receive information, and means for electrically isolating two sections of said bus while maintaining data and control line signal integrity therebetween comprising:

first interface means including first fiber optic transmitting and receiving means, a first interface driver having signal ports interconnecting said first fiber optic transmitting and receiving means with said data line of a first of said bus sections and a control port coupled to said control line of said first section for conditioning said first interface driver to receive or transmit information on said first section data line, and first control means having an input coupled to said control line of said first section and an output coupled to said first fiber optic transmitting means, second interface means including second fiber optic transmitting and receiving means, a second interface driver having signal ports interconnecting said second fiber optic transmitting and receiving means with said data line of a second of said bus sections and a control port, means coupling said control port of said second interface driver to said control line of said second section, and second control means having an output coupled to said control port of said second interface driver and an input coupled to said second fiber optic receiving means for conditioning said second interface driver and said second bus section to receive or transmit information as a function of signals from said first control means, and fiber optic transmission means interconnecting said first and second fiber optic transmitting and receiving means.

2. The system set forth in claim 1 wherein said first control means comprises an oscillator for transmitting a periodic signal to said second control means as a function of signals at said control line of said first section.

3. The system set forth in claim 2 wherein said second control means comprises a filter responsive to presence or absence of said periodic signal for conditioning said second interface driver and said second section.

4. In a half duplex communication system that includes a transmission line interconnecting a plurality of devices with a data line and a control line for indicating impending transmission from one device and conditioning other of said devices to receive information, means for electrically isolating two sections of said transmission line while maintaining data and control line signal integrity therebetween comprising:

first interface means including first fiber optic transmitting and receiving means, a first interface driver having signal ports interconnecting said first fiber optic transmitting and receiving means with said data line of a first of said transmission line sections and a control port coupled to said control line of said first section for conditioning said first interface driver to receive or transmit information on said first section data line, and first control means having an input coupled to said control line of said first section and an output coupled to said first fiber optic transmitting means, second interface means including second fiber optic transmitting and receiving means, a second interface driver having signal ports interconnecting said second fiber optic transmitting and receiving means with said data line of a second of said transmission line sections and a control port, means coupling said control port of said second interface driver to said control line of said second section, and second control means having an output coupled to said control port of said second interface driver and an input coupled to said second fiber optic receiving means for conditioning said second interface driver and said second transmission line section to receive or transmit information as a function of signals from said first control means, and fiber optic transmission means interconnecting said first and second fiber optic transmitting and receiving means.

5. The system set forth in claim 4 wherein said first control means comprises an oscillator for transmitting a periodic signal to said second control means as a function of signals at said control line of said first section.

6. The system set forth in claim 5 wherein said second control means comprises a filter responsive to presence or absence of said periodic signal for conditioning said second interface driver and said second line section.

7. The system set forth in claim 6 for data communication at predetermined maximum frequency, wherein said oscillator has an output frequency greater than said predetermined maximum frequency.

8. The system set forth in claim 7 wherein said filter comprises a retriggerable one-shot responsive to said periodic signal, and an integrator responsive to said one-shot.

9. The system set forth in claim 7 wherein said means coupling said control port of said second interface driver to said control line of said second section comprises an inverter.

10. The system set forth in claim 4 wherein said first and second interface drivers comprise respective serial line drivers.

11. The system set forth in claim 10 wherein said serial line drivers comprises differential line drivers.

12. The system set forth in claim 3 wherein said first and second interface drivers comprises differential line drivers.

13. A man-lift vehicle that includes a wheeled vehicle base, an extensible boom pivotally mounted at one end to said base, a man-lift platform carried at an opposing end of said boom, first and second hydraulic actuators for respectively controlling extension and angle of said boom with respect to said base, first and second electronic controllers carried on said base for dedicated control of respective said actuators, a master controller carried on said platform for operator control of said first and second controllers, a high speed serial bus coupling said master controller to said first and second controllers, said bus including a serial data line and a control line for indicating impending transmission from one of said controllers and means for electrically isolating said master controller from said first and second controllers while maintaining data and control line signal integrity therebetween comprising:

first interface means carried on said platform and including first fiber optic transmitting and receiving means, a first interface driver having signal ports interconnecting said first fiber optic transmitting and receiving means with said data line of said master controller and a control port coupled to said control line of said master controller for conditioning said first interface driver to receive or transmit information on said data line, and first control means having an input coupled to said control line and an output coupled to said first fiber optic transmitting means, second interface means carried on said base and including second fiber optic transmitting and receiving means, a second interface driver having signal ports interconnecting said second fiber optic transmitting and receiving means with said data line of said first and second controllers and a control port, means coupling said control port of said second interface driver to said control line of said first and second controllers, and second control means having an output coupled to said control port of said second interface driver and an input coupled to said second fiber optic receiving means for conditioning said second interface driver and said first and second controllers to receive or transmit information as a function of signals from said first control means, and fiber optic transmission means interconnecting said first and second fiber optic transmitting and receiving means.

14. The system set forth in claim 13 wherein said first control means comprises an oscillator for transmitting a periodic signal to said second control means as a function of signals at said control line of said first section.

15. The system set forth in claim 14 wherein said second control means comprises a filter responsive to presence or absence of said periodic signal for conditioning said second interface driver and said second section.

16. The system set forth in claim 15 further comprising separate first and second power sources on said platform and said base for respectively supplying electrical power to said master controller and said first interface means, and to said first and second controllers and said second interface means.

* * * * *